T. A. EDISON.
Telephonic Telegraph.
No. 198,087.  Patented Dec. 11, 1877.
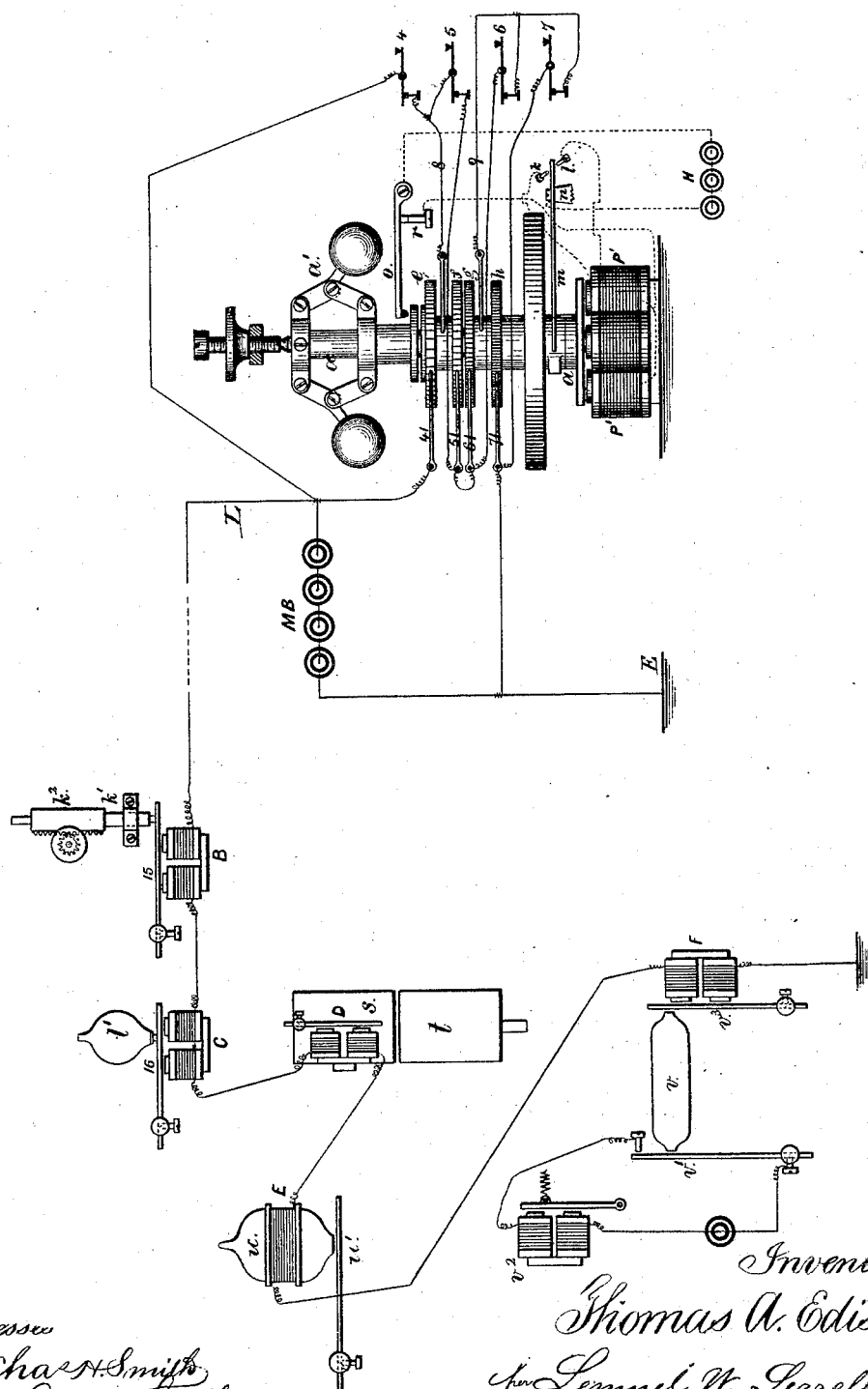

UNITED STATES PATENT OFFICE.

THOMAS A. EDISON, OF MENLO PARK, NEW JERSEY, ASSIGNOR TO THE WESTERN UNION TELEGRAPH COMPANY.

IMPROVEMENT IN TELEPHONIC TELEGRAPHS.

Specification forming part of Letters Patent No. 198,087, dated December 11, 1877; application filed May 16, 1876.

*To all whom it may concern:*

Be it known that I, THOMAS A. EDISON, of Menlo Park, in the county of Middlesex and State of New Jersey, have invented an Improvement in Acoustic Telegraphs, of which the following is a specification:

This invention relates to a series of revolving circuit-closing break-wheels with varying contact teeth and notches, so that each wheel produces a different number of pulsations per minute from the others, in combination with finger-keys and an arrangement of circuits in which the main battery remains in the circuit of the earth and line, and is caused to produce pulsations by being short-circuited through the break-wheels.

It also relates to an arrangement of finger-keys, in combination with the battery in the main line and the break-wheels, whereby, when all the keys are closed, the battery is short-circuited, and the revolving break-wheels are inefficient, and do not transmit waves over the wire; but when either key is opened the short circuit is made to pass through the articular break-wheel connected to the key, and the pulsations are transmitted over the main line; also to an electro-magnet, vibrating reed, and sounding-box or resonator of corresponding pitch, forming a receiving instrument; also, the combination therewith of a local circuit-breaking apparatus actuated by the vibrations of a column of air.

In the drawings, the improvement is shown by a diagram of the apparatus and the circuits.

The shaft $a$ is driven by any desired power. I have shown the same as actuated by an electric engine, P' P', and battery H, and the lever $m$ upon the standard $n$ is moved by two cams upon the shaft $a$, and the spring end of the lever is between the circuit-closing points $k$ $l$, the point $k$ being connected in the circuit through one pair of magnets, and the point $l$ being connected in the circuit through the other pair of magnets, so that the revolution is produced by the lever $m$ closing the circuit through the electro-magnets alternately as the revolving armature is approaching the cores of such magnets.

The governor $a'$ is upon and revolved by the shaft $a$, and $o$ is a lever insulated from contact with the governor or shaft, but acting to close the circuit to the motor through contact-points $r$; hence the speed of the engine will be regulated accurately, for when the velocity increases sufficiently to separate $o$ and $r$, the circuit to the engine will be broken and the reverse; hence the circuit will be closed through $o$ and $r$, delicately, according to the speed.

The circuit closing or break wheels $e$ and $f$ are connected, and also $g$ and $h$, but they are insulated from the shaft $a$; the circuit-closing springs 41 51 61 71 are provided for these wheels respectively, and they are connected to the finger-keys 4, 5, 6, and 7, respectively, and the conductors 8 and 9 are in contact with the respective pairs of break-wheels. The keys and break-wheels are in a short or derived circuit connecting from the line L to the earth E, to short-circuit the main battery.

Premising that the teeth of the respective break-wheels $e\ f\ g\ h$ are at different distances, so that electric pulsations from each wheel will be different in number per minute from the pulsations of the other wheels, I remark that when all the keys 4 5 6 7 are closed the circuit from the line to earth is closed independent of the break-wheels $e\ f\ g\ h$; hence the battery M B will be short-circuited; but if the key 4 is opened the short circuit is only closed through 41, $e$, and 8; and hence the break-wheel $e$ will alternately short-circuit the battery M B, and allow the same to charge the line, and there will be as many electric pulsations sent upon the line, at the speed of the circuit-breaker $e$, as there are contact-points passing while the key 4 is open.

If the key 5 is opened, the short circuit of the battery is, by 4 8 $f$ 51 6 7, to earth, the break-wheel $f$ and spring 51 giving the pulsations. If the key 6 is open, the circuit will be by 4 5 61 $g$ 9 7, to earth, and the pulsations will be by the break-wheel $g$ and spring 61. If the key 7 is open, the circuit will be by 4 5 6 9 $h$ 71 to earth, the pulsations being by break-wheel $h$ and spring 71.

By this arrangement each break-wheel is brought into action by opening the corresponding key, and two or more break-wheels can be brought into action without either one preventing the action of the others, so that if all the keys should be opened simultaneously all the break will be operative, the short circuit being 41, $e$, $f$, 51, 61, $g$, $h$, and 71.

At the receiving-station, the main circuit from the line passes through the helices B C D E F of the respective electro-magnets, and in front of the magnets B and C are reeds 15 and 16, of a tone to vibrate by pulsations of the speed sent from two of the transmitting instruments. The reed 15 is in front of the telescopic-tube resonator, that is made of tubes $k^1$ $k^2$, one of which is movable by rack and pinion, or otherwise, so as to vary the length and quickly adjust the same to the tone of the reed or to the pitch required for the pulsations that are being sent. This allows for adjusting the reed itself, or for adjusting a vibrating body that is moved by the electro-magnet, whether the same is toned or not.

This sounding-box or resonator, being adjustable, accommodates the receiving-instrument to variations in the pulsations that may result from inaccuracy in the speed of the transmitting-instrument.

The reed 16, or its equivalent, is made with a valve at the mouth of the resonator $l'$, so that the atmosphere therein will be vibrated by the corresponding pulsations acting in the electro-magnet, and from these resonators the signal may be ascertained by the ear applied to their small tubes.

The sounding-box $s$ has upon it the magnet D and a reed or other vibrating body. The box is of such length as to respond to the vibrations of a certain pitch, and in front of the box $s$ is a sounder-box, $t$, by which the column of air can be regulated and extraneous sounds kept from the box.

The Helmholz resonator $u$ is made of a hollow iron shell, with fine wire wound around it, forming the helix E, through which the current passes.

The shell of the resonator becomes a magnetized core, and attracts the reed $u'$, causing the same to vibrate in front of it, and by the expansion and contraction the air within is set in powerful vibration. The reed $u$ may be made to operate a local circuit or to give the indication by sound.

The electro-magnet F, with a reed, $v^3$, toned to the proper pitch, is used in connection with the air-tube $v$, that is a resonator of the proper pitch corresponding to the reed.

A delicate contact-spring, $v^1$, is applied at the opposite open end to the reed $v^3$. It is preferably toned to the same pitch as the tube $v$ and reed $v^3$, and vibrates by the action of the air in $v$.

The sounder $v^2$ is in a local circuit, of which the reed or spring $v^1$ forms a part; hence the sounder responds to the vibrations of the reed $v^3$.

I do not claim a series of wheels revolved by mechanism and transmitting pulsations corresponding in time to vibrations of an acoustic receiving-reed.

I claim as my invention—

1. A telegraphic circuit and battery, a series of revolving break-wheels, and a series of finger-keys, arranged in a derived circuit between the line and the earth, substantially as set forth, whereby the revolving break-wheels are short-circuited through the finger-keys, substantially as specified.

2. The combination, in a telegraph, of an electro-magnet, a sounding box or tube containing a column of air, and a reed acting as a valve at the mouth of the tube, so that the column of air is vibrated by pulsations in the electro-magnet, substantially as set forth.

3. An iron resonant tube or sphere, surrounded with a wire helix, and included in a telegraphic circuit, substantially as set forth.

4. The combination of an electro-magnet, vibrating reed, sounding-box or resonator of corresponding pitch, and a local circuit-breaking apparatus, actuated by the vibrations of a column of air in said resonator, substantially as set forth.

Signed by me this 9th day of May, 1876.

THOS. A. EDISON.

Witnesses:
J. D. RUSS,
CHAS. BATCHELOR.